Sept. 25, 1956
A. VENDITTY
2,764,037
ACCELERATOR PEDAL ATTACHMENT
Filed Dec. 22, 1952
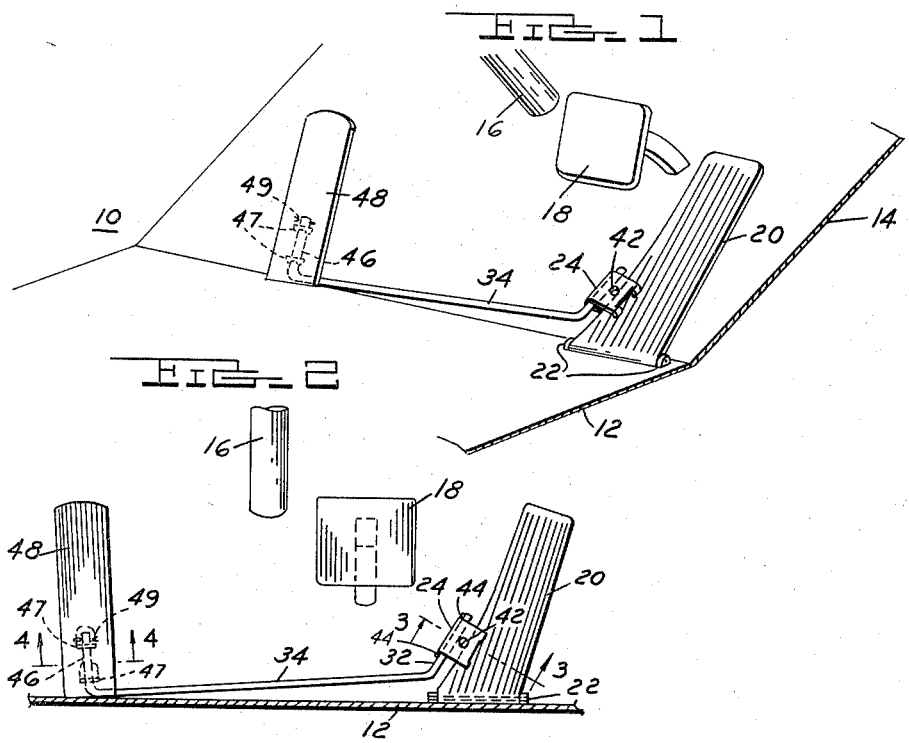
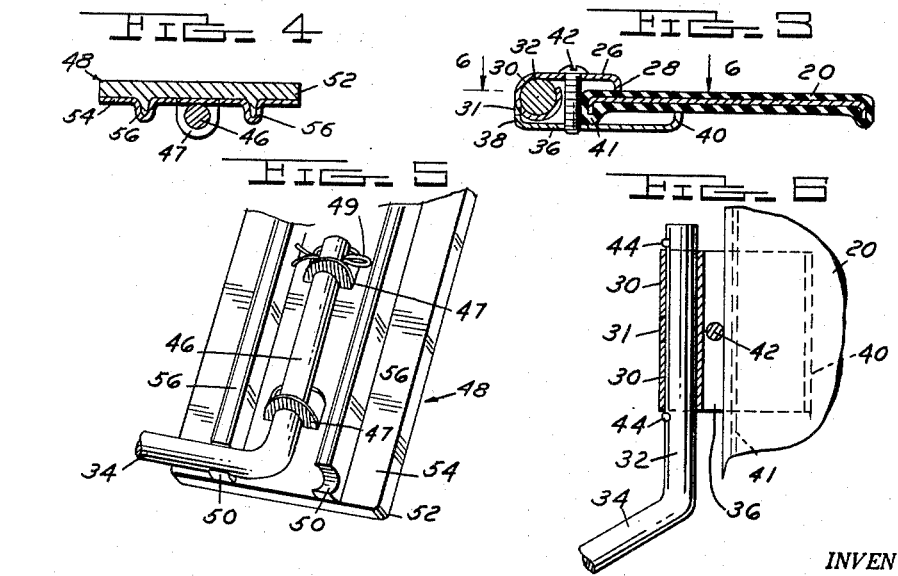
INVENTOR.
Anthony Venditty
BY
Burton & Parker
ATTORNEYS

United States Patent Office 2,764,037
Patented Sept. 25, 1956

2,764,037

ACCELERATOR PEDAL ATTACHMENT

Anthony Venditty, Detroit, Mich.

Application December 22, 1952, Serial No. 327,319

5 Claims. (Cl. 74—562.5)

This invention relates to accelerator pedals and particularly to an auxiliary pedal operable by the driver's left foot.

In automotive vehicles having only an eccelerator and a brake pedal, and consequently vehicles which in operation require only the attention of the operator's right foot, it becomes desirable for the left foot also to be used in operating the vehicle, thereby reducing the strain on the right foot. Therefore, an object of this invention is to provide an auxiliary accelerator pedal which is disposed on the toeboard in a position to be operated by the driver's left foot.

Another object is to provide an automotive vehicle accelerator pedal with an attachment provided with an auxiliary pedal disposed for engagement by the left foot of the driver of the vehicle whereby the driver's right foot may constantly be maintained in a position to engage the brake pedal of the vehicle.

A further object of the invention is the provision of an auxiliary accelerator pedal which may be directly coupled to the conventional pedal without any alteration of either the construction or operating linkage of the conventional pedal.

Another object is the provision of an eccelerator pedal attachment which includes an arm coupled at one end to the conventional accelerator pedal and extending generally transversely of the toeboard, mounting at the other end an auxiliary pedal the actuation of which actuates the accelerator pedal.

A still further object of the invention is the provision of a U-shaped arm having one leg coupled with the conventional accelerator pedal and the other leg pivotally resting on the toeboard and extending angularly upwardly therefrom, and exhibiting an auxiliary accelerator pedal.

Another object of the invention is the provision of an auxiliary accelerator pedal mounted upon one leg of a U-shaped arm which is supported both pivotally and slidably by the toeboard and which is pivotally mounted upon the conventional accelerator pedal to actuate the accelerator pedal upon actuation of the auxiliary pedal.

Still another object of the invention is the provision of a left foot auxiliary pedal attachment for the conventional accelerator pedal of a motor vehicle which includes improved clamping means which pivotally couples a U-shaped arm supporting an auxiliary accelerator pedal to the conventional accelerator pedal.

A still further object is the provision of an auxiliary accelerator pedal which may be directly coupled to the conventional accelerator pedal and pivot upon the floor board of the vehicle even though the plane of rotation of that point upon the conventional pedal at which the auxiliary pedal is coupled to the conventional pedal is oblique with respect to the pivotal axis of the auxiliary pedal.

More specifically, an object is to provide a left foot accelerator pedal attachment for the conventional accelerator pedal of a motor vehicle, which conventional accelerator pedal is pivotally supported at one end upon the floor of the vehicle for swinging depressible movement obliquely with respect to the floor. Such attachment includes an accelerator pedal mounted upon one leg of the U-shaped arm, the opposite end of which is disposed angularly with respect to the first leg and is so hingedly coupled with the conventional accelerator pedal spaced above the pivotal support of such pedal that the end of the U-shaped arm which terminates in the first leg and carries the auxiliary pedal is freely pivotally supported at all times upon the floor of the vehicle spaced transversely from the conventional accelerator pedal. The point of pivotal seating of the end of the U-shaped arm which rests upon the floor of the vehicle is normally at the juncture of the sloping toeboard portion of the floor and the horizontal floor board portion thereof.

Other objects, advantages and meritorious features of the invention will more fully appear in the following specification, appended claims and accompanying drawings, wherein:

Fig. 1 is a perspective view showing my improved auxiliary pedal attached to the conventional pedal and in operable position on the toeboard of an automobile;

Fig. 2 is a front elevation showing the shape of the arm carrying my pedal and the angularity of the conventional pedal with respect to the center line of the vehicle;

Fig. 3 is a cross sectional view of the conventional accelerator pedal taken on line 3—3 of Fig. 2;

Fig. 4 is a cross sectional view of my pedal taken on line 4—4 of Fig. 2;

Fig. 5 is a perspective view of the underside of my pedal as it is attached to the supporting arm; and, Fig. 6 is a cross sectional view taken on line 6—6 of Fig. 3.

Fig. 1 shows the floor boards 10 of an automotive vehicle comprising a horizontal board 12 and a toe-board 14 exhibiting a steering post 16, a brake pedal 18, and an accelerator pedal 20. The accelerator pedal is pivotally mounted as at 22 upon the horizontal board. Fig. 1 shows the axis of pivotal movement as being substantially perpendicular to the center line of the vehicle. But it should be understood that my invention will apply equally well to an accelerator pedal pivoted on an axis oblique to the center line and that normally the floor 12 slopes downwardly and outwardly away from the center line of the vehicle.

The accelerator shaped as shown in Figs. 1 and 2, defines opposed side edges extending angularly upwardly from the pivotal axis. The accelerator is so shaped because the normal or relaxed position assumed by the driver's right foot when resting upon the floor corresponds to the angular shape of the pedal.

An improved clamp 24 is clamped on the accelerator. It comprises, as shown in Fig. 3, an upper plate 26 having an angular marginal flange 28 adapted to abut the upper face of the pedal. The other margin of the plate is rolled as at 30 and adapted to encircle the leg 32 of the U-shaped arm 34. The rolled portion has an ear crimped outwardly as at 31. A bottom plate 36, having opposed upturned flanges 38 and 40, overlies the bottom of the pedal and rolled portion 30 of the upper plate, and is held thereagainst under tension by screw 42. Flange 38 of the plate 36 bears against the outwardly crimped ear 31 of the rolled portion 30 and flange 40 bears against the underside of the accelerator pedal and this plate also bears against the enlarged margin 41 of the accelerator pedal. Upon tightening of screw 42, the two plates unyieldingly grip the pedal therebetween and the lower plate 36 is held against the underside of the accelerator pedal as at 40 and 41 and against the ear 31 as described. Leg 32 is gripped within the rolled portion of plate 26 but is rotatable within such rolled portion.

The two plates 26 and 36 are of unequal width whereby their marginal flanges 28 and 40 engage opposite edges of the accelerator pedal offset from each other.

Leg 32 of the U-shaped arm exhibits a pair of nodes 44 adapted to abut each end of the curved portion 30 of the plate 26, and prevent axial movement of the leg. By revolving the arm to a position such that the nodes are aligned with the space between the end of the roll 30 and the underside of plate 26, the leg may be withdrawn from the roll.

Arm 34 extends across the floor in front of the brake pedal and downwardly to rest upon the floor. It usually rests freely upon the floor at the juncture of the horizontal portion of the floor 12 with the toeboard portion 14. Such arm is provided with an upturned leg 46 adapted to support an auxiliary accelerator pedal 48 secured thereto by any convenient fasteners such as shown in Fig. 4. The leg 46 extends through a pair of spaced perforated ears 47 secured to the underside of the auxiliary pedal 48. A cotter pin 49 extends through the arm 46 as shown securing the pedal to the arm. A pair of bifurcated supports 50 are shown mounted on the underside of the auxiliary pedal. Arm 34 is adapted to seat in either one of the supports 50. Two supports are provided so that the arm 34 may extend in either direction away from the pedal 48. This permits the invention to be used on a vehicle with a right-hand drive as well as a left hand drive vehicle.

The auxiliary pedal comprises a rubber surface 52 rigidly supported upon a plate 54 reinforced by longitudinal ribs 56.

Because the side edges of the accelerator 20 extend angularly away from the pivot 22, upon depression of the pedal clamp 24 will describe an arc whose plane is oblique to the pivotal axis of the accelerator. Therefore, if arm 34 is not pivotally clamped to the pedal, but rather rigidly fixed thereto, depression of the pedal will raise leg 46 of the arm off the toeboard. This would be very undesirable because then the arm would necessarily have to carry the entire weight of the driver's left foot. Further, the action of the auxiliary pedal would be a rocking motion instead of a more easily controlled pivotal movement. Also, as the angle between the sides edges of the conventional pedal and the centerline of the vehicle increases, the leg 46 will be raised even further off the toeboard.

It will be noted that by pivotally connecting the arm 34 to the conventional pedal, the auxiliary pedal supporting arm seats upon the floor as the auxiliary pedal is swung, and pivots freely upon the floor. As it pivots free sliding action over the floor is permitted.

It will be appreciated that my invention is as well adapted for use with a conventional pedal whose pivotal axis is oblique to the desired pivotal axis of the auxiliary pedal as to the conventional pedal shown in the drawings. Furthermore, as shown in the drawing, the leg 32 is disposed generally parallel to the accelerator pedal 20 to which it is attached. It is also to be noted that the auxiliary pedal may be swung up out of the way for cleaning the floor. The attachment is of such a character that it can be installed or removed without employment of special tools and without alteration of the conventional structure. It is of course obvious that the vehicle may be driven through the use of either the standard or auxiliary pedal.

What I claim is:

1. An auxiliary accelerator pedal attachment for automotive vehicles having a floor and having a primary accelerator pedal pivotally mounted on the floor and extending angularly upwardly therefrom, comprising: an arm exhibiting two spaced apart legs, a clamp mounted on the primary pedal above the pivotal support of the pedal, said clamp shaped to define a journal bearing for one of said legs with the axis of the bearing disposed substantially perpendicularly with respect to the pivotal axis of the primary accelerator pedal on the floor, one of the legs rotatably seated within said bearing with the arm adapted to extend across the floor and downwardly theretoward to pivotally seat thereupon, and an auxiliary pedal mounted upon the other leg and pivotable toward and away from the floor to pivot the primary pedal toward and away from the floor.

2. An auxiliary accelerator pedal attachment for a motor vehicle having a generally horizontal floorboard portion and a toeboard portion obliquely inclined upwardly and forwardly with respect to the horizontal floorboard portion and having a primary accelerator pedal pivotally supported upon the floorboard portion for depressible swinging movement, comprising, in combination, a U-shaped arm having one leg disposed obliquely angularly with respect to the base of the U and pivotally coupled to one margin of the primary accelerator pedal with the axis of the pivot extending toward the pivotal connection of the primary pedal and the floorboard, an auxiliary pedal mounted upon the opposite leg of the U-shaped arm, said opposite end of the base of the U-shaped arm freely pivotally seated upon the floor of the vehicle substantially at the juncture of the toeboard portion and the horizontal floorboard portion.

3. An auxiliary accelerator pedal attachment for automotive vehicles having a floor and having a primary accelerator pedal pivotally mounted on the floor and extending angularly upwardly therefrom, comprising: an arm exhibiting two spaced apart legs, one of said legs pivotally coupled to the primary accelerator pedal on an axis of pivot extending substantially parallel to a longitudinal dimension of the primary pedal and toward the pivotal connection of the primary pedal and the floor, that portion of the arm intermediate the legs extending across the floor and downwardly theretoward to rest freely pivotally thereupon, and the other leg of the arm extending upwardly angularly away from the floor for pivotal movement toward and away therefrom, and an auxiliary pedal mounted upon the second mentioned leg to pivot therewith.

4. An auxiliary accelerator pedal attachment for automotive vehicles having a floor and having a primary accelerator pedal pivotally mounted on the floor and extending angularly upwardly therefrom, comprising: an arm exhibiting two spaced apart legs, a clamp mounted on the primary pedal above the pivotal support of the pedal, said clamp defining a pair of opposed plates of unequal width and having corresponding margins bent toward each other and adapted to grip therebetween the primary accelerator pedal, the opposite margin of one of the plates being rolled inwardly to provide a cylindrical arm-receiving bearing, the opposite margin of the plate bent toward the opposed plate and adapted to abut a portion of the rolled cylindrical arm-receiving bearing thereof, means connecting the plates and adapted to urge them together, one of the legs of the arm rotatably seated within said bearing with the arm adapted to extend across the floor and downwardly theretoward to pivotally seat thereupon, and an auxiliary pedal mounted upon the other leg and pivotable toward and away from the floor to pivot the primary pedal toward and away from the floor.

5. The invention as defined in claim 4 characterized in that the cylindrical arm-receiving bearing exhibits an outwardly extending ear and said opposite margin of the other plate is adapted to abut the ear.

References Cited in the file of this patent

UNITED STATES PATENTS

| | | |
|---|---|---|
| 1,970,160 | Allison et al. | Aug. 14, 1934 |
| 2,088,182 | Verch | July 27, 1937 |
| 2,174,419 | Holtzclaw | Sept. 26, 1939 |
| 2,226,569 | Martin | Dec. 31, 1940 |
| 2,430,561 | Fletcher | Nov. 11, 1947 |
| 2,618,171 | Curtis | Nov. 18, 1952 |
| 2,645,948 | Beckman | July 21, 1953 |

OTHER REFERENCES

"Lazy-Leg," Evers Mfg. Co., August 7, 1953, 1 page brochure, Box 186, Lorain, Ohio.